(12) United States Patent
Zhao et al.

(10) Patent No.: US 11,546,592 B2
(45) Date of Patent: Jan. 3, 2023

(54) FLEXIBLE BLOCK PARTITIONING FOR CHROMA COMPONENT

(71) Applicant: TENCENT AMERICA LLC, Palo Alto, CA (US)

(72) Inventors: Liang Zhao, Sunnyvale, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/087,236

(22) Filed: Nov. 2, 2020

(65) Prior Publication Data

US 2021/0211659 A1 Jul. 8, 2021

Related U.S. Application Data

(60) Provisional application No. 62/958,422, filed on Jan. 8, 2020.

(51) Int. Cl.
| | | |
|---|---|---|
| *H04N 19/14* | (2014.01) | |
| *H04N 19/119* | (2014.01) | |
| *H04N 19/176* | (2014.01) | |
| *H04N 19/186* | (2014.01) | |
| *H04N 19/196* | (2014.01) | |

(52) U.S. Cl.
CPC ........... *H04N 19/119* (2014.11); *H04N 19/14* (2014.11); *H04N 19/176* (2014.11); *H04N 19/186* (2014.11); *H04N 19/196* (2014.11)

(58) Field of Classification Search
None
See application file for complete search history.

(56) References Cited

U.S. PATENT DOCUMENTS

| 2010/0208827 A1 | 8/2010 | Divorra Escoda et al. |
| 2012/0082238 A1* | 4/2012 | Panusopone ......... H04N 19/172 375/240.24 |
| 2014/0192154 A1 | 7/2014 | Jeong et al. |
| 2014/0294078 A1* | 10/2014 | Seregin ................ H04N 19/503 375/240.15 |

(Continued)

FOREIGN PATENT DOCUMENTS

| WO | 2018/037853 A1 | 3/2018 |
| WO | 2018/142823 A1 | 8/2018 |

OTHER PUBLICATIONS

Kim et al., "Block Partitioning Structure in the HEVC Standard, IEEE Transactions on Circuit and Systems for Video Technology, vol. 22, No. 12, Dec. 2012".*

Benjamin Bross, et al., "Versatile Video Coding (Draft 7)", Joint Video Experts Team (JVET) of ITU-T SG 16 WP 3 and ISO/IEC JTC 1/SC 29/WG 11, Oct. 1 -11, 2019, pp. 1-468.

(Continued)

*Primary Examiner* — Mohammad J Rahman
(74) *Attorney, Agent, or Firm* — Sughrue Mion, PLLC

(57) ABSTRACT

An approach for encoding/decoding video data including parsing video data to obtain partitioning parameters; obtaining a partitioned super block; and decoding based on the partitioned super block, wherein based on a luma block area size, or a luma splitting depth of the smallest luma block, either luma blocks and chroma blocks of the partitioned super block are partitioned based on a first block partitioning structure, or the luma blocks are partitioned based on the first block partitioning structure, and the chroma blocks are partitioned based on a second block partitioning structure.

16 Claims, 12 Drawing Sheets

(56) References Cited

U.S. PATENT DOCUMENTS

| | | | |
|---|---|---|---|
| 2015/0304662 A1 | 10/2015 | Liu et al. | |
| 2017/0272750 A1 | 9/2017 | An et al. | |
| 2018/0131962 A1 | 5/2018 | Chen et al. | |
| 2018/0288446 A1* | 10/2018 | An | H04N 19/70 |
| 2020/0204812 A1* | 6/2020 | Wang | H04N 19/172 |
| 2020/0204833 A1* | 6/2020 | Egilmez | H04N 19/70 |
| 2020/0382798 A1* | 12/2020 | Xu | H04N 19/11 |
| 2021/0014536 A1* | 1/2021 | Chen | H04N 19/66 |
| 2021/0235079 A1* | 7/2021 | Chuang | H04N 19/176 |
| 2021/0235101 A1* | 7/2021 | Sim | H04N 19/44 |
| 2021/0321098 A1* | 10/2021 | Chuang | H04N 19/96 |
| 2022/0086439 A1* | 3/2022 | Tsai | H04N 19/11 |

OTHER PUBLICATIONS

Yue Chen, et al., "An Overview of Core Coding Tools in the AV1 Video Codec", IEEE PCS, 2018, pp. 41-45.
Peter de Rivaz, et al., "AV1 Bitstream & Decoding Process Specification", Jan. 8, 2019, pp. 1-669.
Kim et al., "Block Partitioning Structure in the HEVC Standard", IEEE Transactions on Circuits and Systems for Video Technology, vol. 22, No. 12, Dec. 2012, pp. 1697-1706.
International Search Report dated Mar. 23, 2021 from the International Searching Authority in International Application No. PCT//US2021/012479.
Written Opinion dated Mar. 23, 2021 from the International Bureau in International Application No. PCT/US2021/012479.
Office Action dated Oct. 18, 2022 in Japanese Application No. 2021-558680.

\* cited by examiner

FIG. 8

FLEXIBLE BLOCK PARTITIONING FOR CHROMA COMPONENT

CROSS-REFERENCE TO RELATED APPLICATION

This application claims priority under 35 U.S.C. § 119 to U.S. Provisional Application No. 62/958,422, filed on Jan. 8, 2020, in the United States Patent & Trademark Office, the disclosure of which is incorporated herein by reference in its entirety.

FIELD

This disclosure relates generally to the field of data processing, and more particularly to video encoding and/or decoding involving flexible block partitioning for chroma components.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. AOMedia Video 2 (AV2) is currently under development. In AV1, quantization step sizes have limited resolution.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

Embodiments relate to a method, system, and computer readable medium for encoding and/or decoding video data. According to one aspect, a method for encoding and/or decoding video data is provided. The method may include obtaining video data; parsing the obtained video data to obtain partitioning parameters; obtaining a partitioned super block based on the partitioning parameters; and decoding the video data based on the partitioned super block, wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure, and wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure.

According to one aspect, a device for encoding and/or decoding video data is provided. The device may include at least one memory configured to store program code; and at least one processor configured to read the program code and operate as instructed by the program code, the program code including: first obtaining code configured to cause the at least one processor to obtain video data; parsing code configured to cause the at least one processor to parse the obtained video data to obtain partitioning parameters; second obtaining code configured to cause the at least one processor to obtain a partitioned super block based on the partitioning parameters; and decoding code configured to cause the at least one processor to decode the video data based on the partitioned super block, wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure, and wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure.

According to one aspect, a non-transitory computer-readable medium for encoding and/or decoding video data is provided. The non-transitory computer-readable medium may store instructions including one or more instructions that, when executed by one or more processors of a device for video coding, cause the one or more processors to: obtain video data; parse the obtained video data to obtain partitioning parameters; obtain a partitioned super block based on the partitioning parameters; and decode the video data based on the partitioned super block, wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure, and wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 8 illustrates an example of a coding tree structure for luma and chroma components, according to at least one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, encode and/or decode video data using an extended quantizer for efficient compression of the video data. Therefore, some embodiments have the capacity to improve the field of computing by providing an extended quantizer in AV2.

As previously described, AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Currently the AV1 quantization step sizes have limited resolution. Although the step size range has increased, the valid range of Q index is the same. This limitation in quantization step resolution is more evident for 10-bit and 12-bit internal bit depth, where the corresponding 8-bit step size (obtained using the q_idx) is scaled by 4 and 16 respectively. This can affect the granularity of bit rates that can be achieved by the codec. It may be advantageous, therefore, to increase quantization step size resolution by extending a range of a quantization index.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
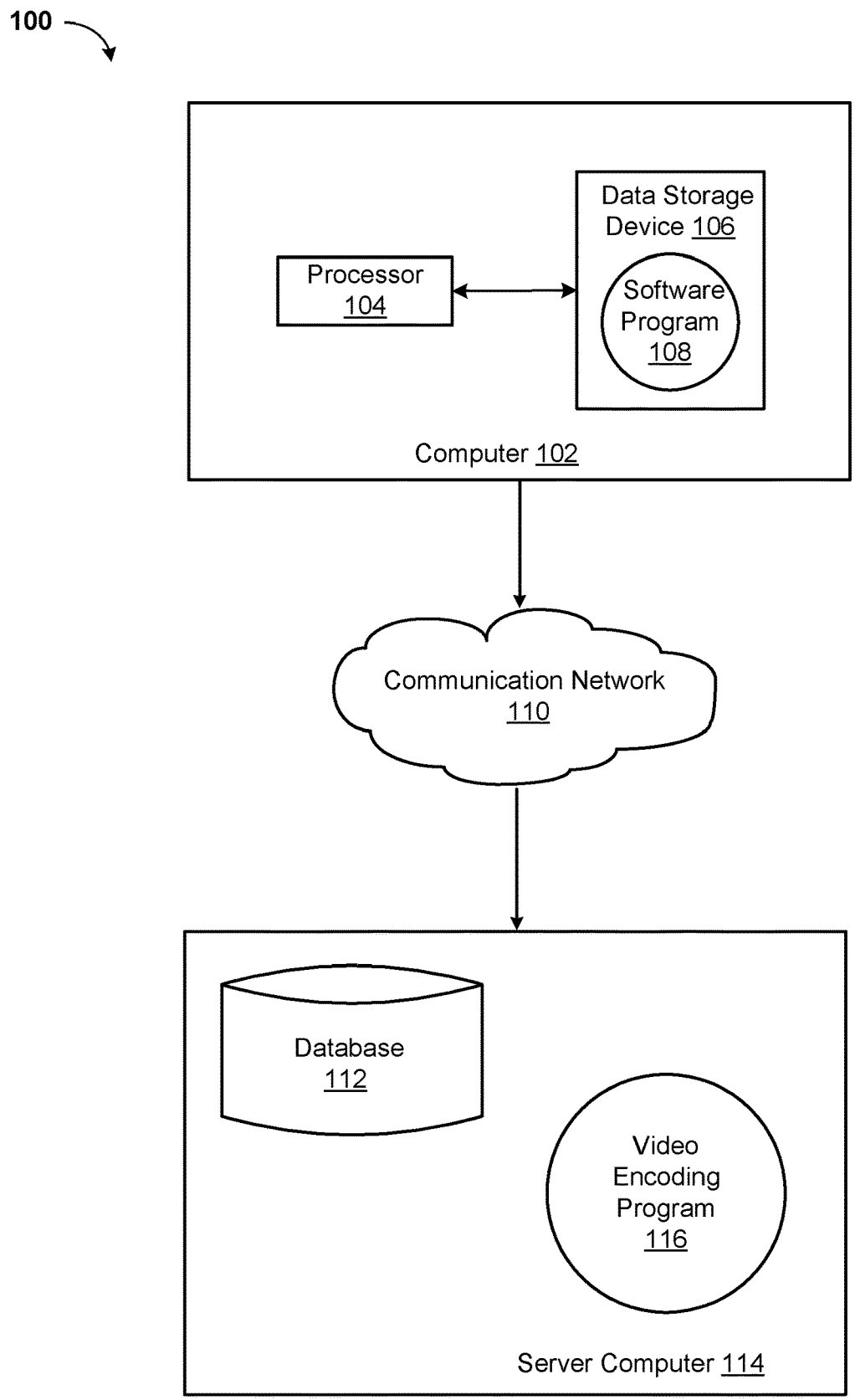
FIG. 1 illustrates a networked computer environment according to at least one embodiment.

Referring now to FIG. 1, a functional block diagram of a networked computer environment illustrating a video coding system 100 (hereinafter "system") for encoding and/or decoding video data according to exemplary embodiments such as those described herein. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 10 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 11 and 12. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. The Video Encoding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

In HEVC, a coding tree unit (CTU) may be split into coding units (CUs) by using a quadtree structure denoted as coding tree to adapt to various local characteristics. The decision on whether to code a picture area using inter-picture (temporal) or intra-picture (spatial) prediction may be made at the CU level. Each CU can be further split into one, two or four PUs according to the PU splitting type. Inside one PU, the same prediction process may be applied, and the relevant information may be transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU.

Figure 2:
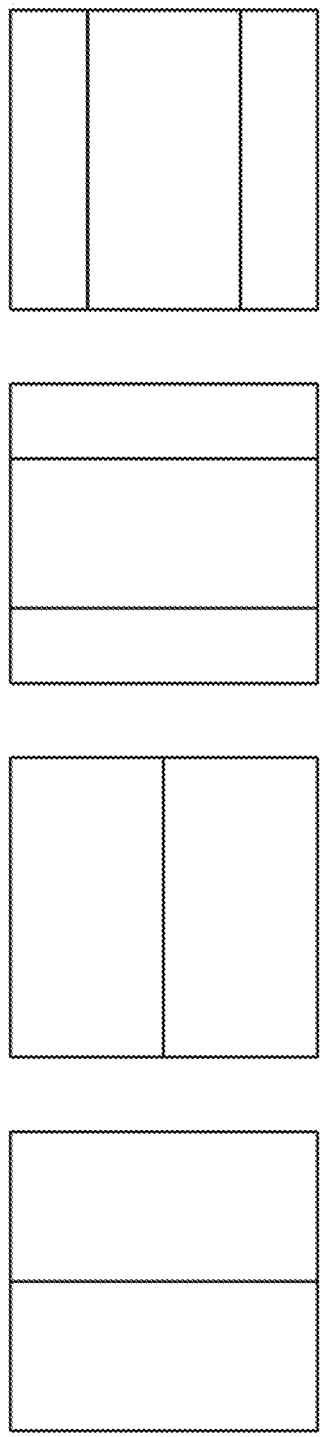
FIG. 2 illustrates an example of a multi-type tree splitting modes, according to at least one embodiment.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) may be first partitioned by a quaternary tree (a.k.a. quadtree) structure. Then the quaternary tree leaf nodes can be further partitioned by a multi-type tree structure. As shown in FIG. 2, there may be four splitting types in multi-type tree structure: vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation may be used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.

Figure 3:
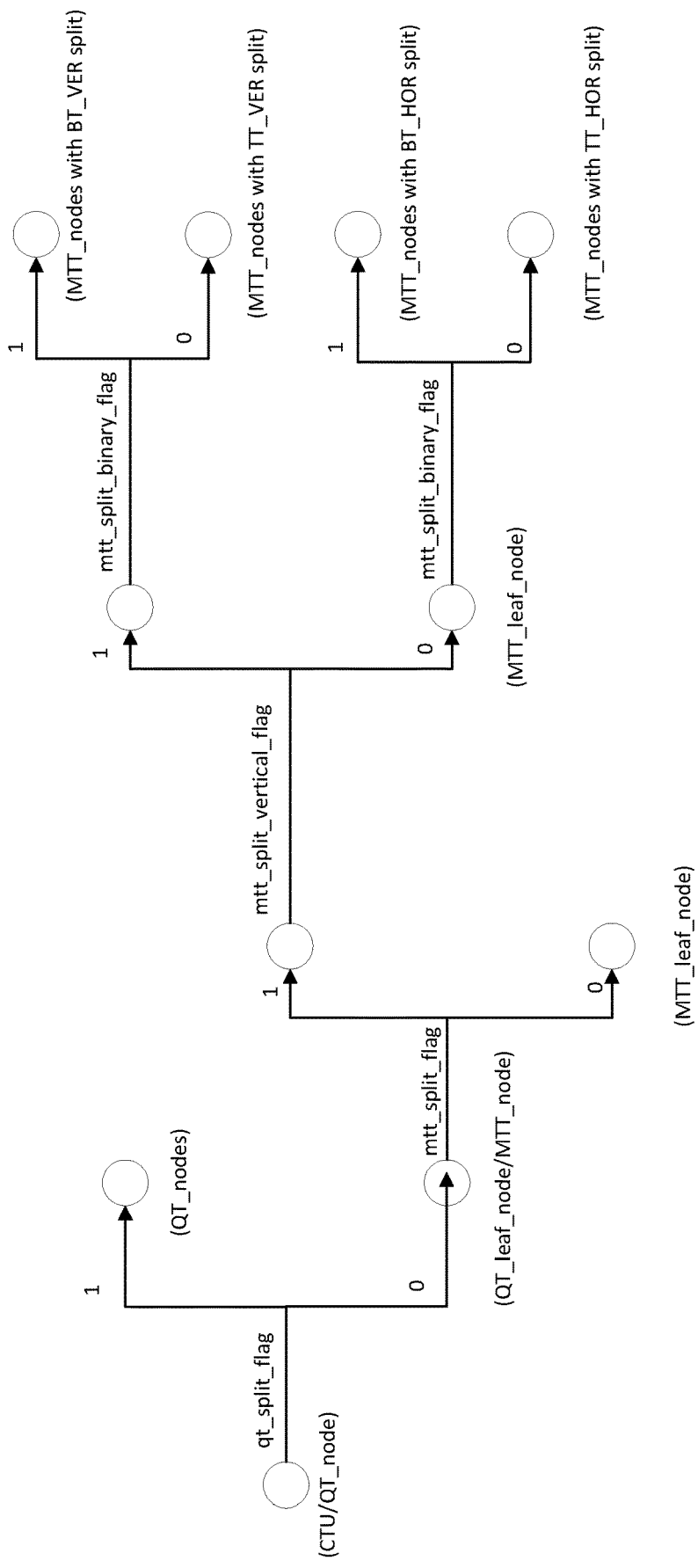
FIG. 3 illustrates an example of splitting flags signaling in quadtree with nested multi-type tree coding tree structure, according to at least one embodiment.

FIG. 3 illustrates an example of a signaling mechanism of the partition splitting information in quadtree with nested multi-type tree coding tree structure, according to embodiments. A CTU may be treated as the root of a quaternary tree and may be first partitioned by a quaternary tree structure. Each quaternary tree leaf node (when sufficiently large to allow it) may be then further partitioned by a multi-type tree structure. In the multi-type tree structure, a first flag (mtt_split_cu_flag) may be signaled to indicate whether the node is further partitioned; when a node is further partitioned, a second flag (mtt_split_cu_vertical_flag) may be signaled to indicate the splitting direction, and then a third flag (mtt_split_cu_binary_flag) may be signaled to indicate whether the split is a binary split or a ternary split. Based on the values of mtt_split_cu_vertical_flag and mtt_split_cu_binary_flag, the multi-type tree slitting mode (MttSplitMode) of a CU may be derived as shown in Table 1.

TABLE 1

| MttSplitMode derviation based on multi-type tree syntax elements | | |
|---|---|---|
| MttSplitMode | mtt_split_cu_vertical_flag | mtt_split_cu_binary_flag |
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 4:
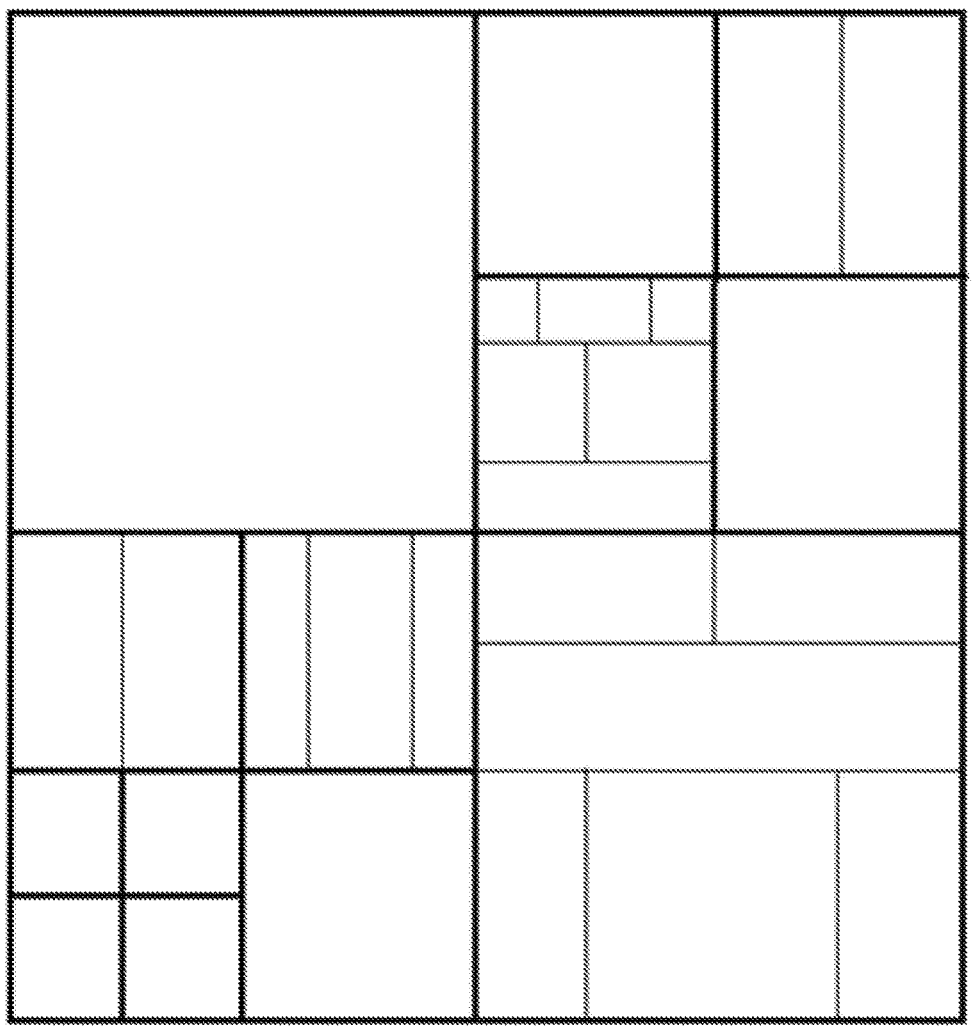
FIG. 4 illustrates an example of a quadtree with nested multi-type tree coding block structure, according to at least one embodiment.

FIG. 4 shows an example of a CTU divided into multiple CUs with a quadtree and nested multi-type tree coding block structure according to embodiments, where the bold block edges represent quadtree partitioning and the remaining edges represent multi-type tree partitioning. The quadtree with nested multi-type tree partition provides a content-adaptive coding tree structure including of CUs. The size of the CU may be as large as the CTU or as small as 4×4 in units of luma samples. For the case of the 4:2:0 chroma format, the maximum chroma CB size may be 64×64 and the minimum chroma CB size may be 2×2.

In VVC, the maximum supported luma transform size may be 64×64 and the maximum supported chroma transform size may be 32×32. When the width or height of the CB may be larger than the maximum transform width or height, the CB may be automatically split in the horizontal and/or vertical direction to meet the transform size restriction in that direction.

In VTM7, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB may be partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

Figure 5:
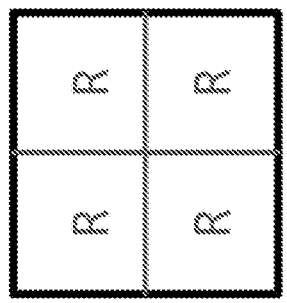
FIG. 5 illustrates an example of a coding tree structure in VP9, according to at least one embodiment.
Figure 5:
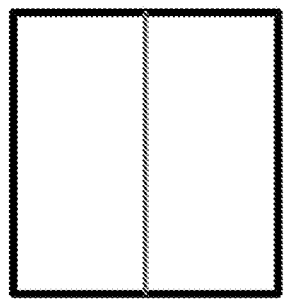
Figure 5:
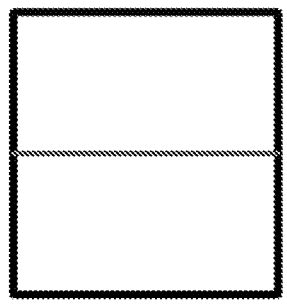
Figure 5:
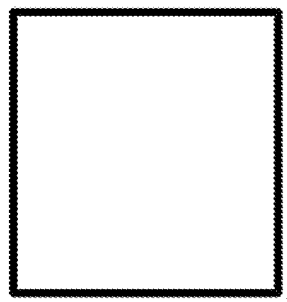

As shown in FIG. 5, VP9 uses a 4-way partition tree starting from the 64×64 level down to 4×4 level, with some additional restrictions for blocks 8×8. As shown in FIG. 5, partitions designated as R may be referred to as recursive in that the same partition tree may be repeated at a lower scale until we reach the lowest 4×4 level.

Figure 6:
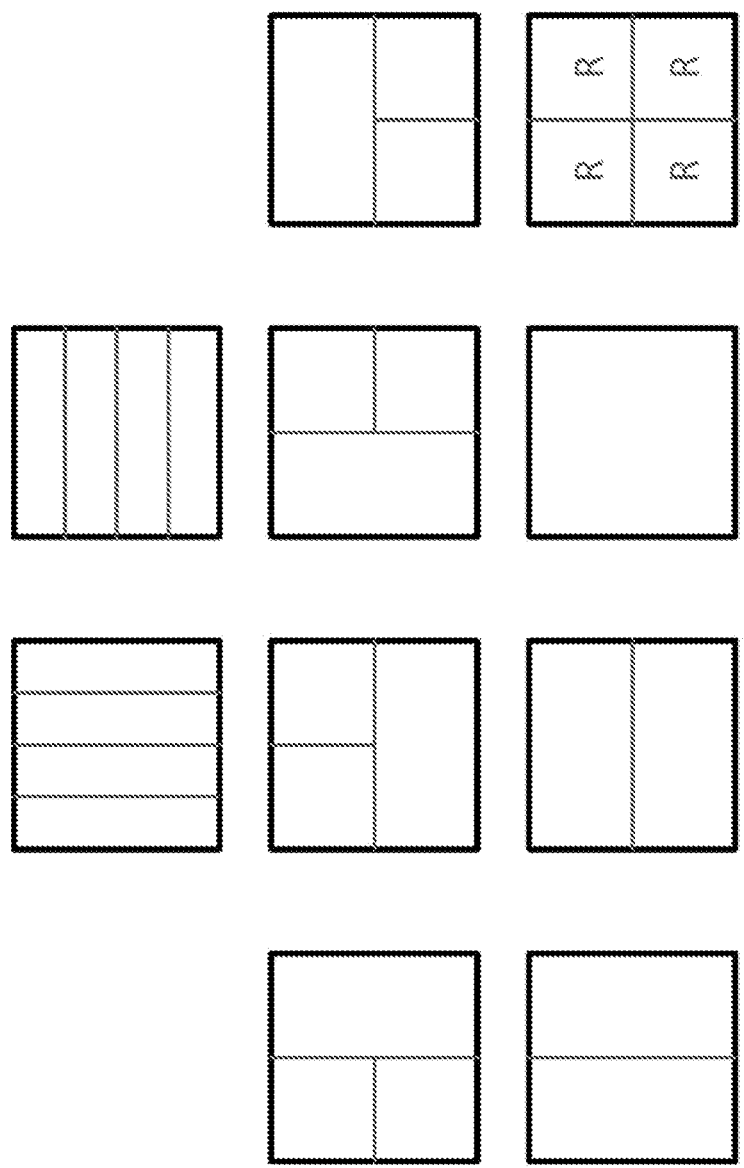
FIG. 6 illustrates an example of a coding tree structure in AV1, according to at least one embodiment.

As shown in FIG. 6, AV1 not only expands the partition-tree to a 10-way structure, but also increases the largest size (referred to as superblock in VP9/AV1 parlance) to start from 128×128. Note that this may include 4:1/1:4 rectangular partitions that did not exist in VP9. None of the rectangular partitions can be further subdivided. In addition to coding block size, coding tree depth may be defined to indicate the splitting depth from the root note. To be specific, the coding tree depth for the root node, e.g. 128×128, may be set to 0, and after tree block may be further split once, the coding tree depth may be increased by 1.

Instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, we support square, 2:1/1:2, and 4:1/1:4 transform sizes from 4×4 to 64×64. For chroma blocks, only the largest possible transform units are allowed.

In AV1, the luma and chroma CUs in one CTU must share the same coding tree structure. In embodiments, a CU may correspond to, for example, a block, and a CTU may correspond to, for example, a super block. However, the chroma component may have less textures than luma component, and it may not be optimal to always use the same coding tree structure with luma component.

In embodiments, when the luma block area size is greater than one threshold T1 or coding tree splitting depth of luma block is smaller than or equal to one threshold T2, then chroma block may use the same coding tree structure as luma. Otherwise when the block area size is smaller than or equal to T1 or luma splitting depth is larger than T2, the corresponding chroma block can have different coding block partitioning with luma component, which may be called flexible block partitioning for chroma component. T1 may be a positive integer, such as 128 or 256. T2 may be a positive integer, such as 1 or 2.

In at least one embodiment, the flexible block partitioning for chroma component may be only applied to I-frame (Intra frame).

In at least one embodiment, when luma block area size is greater than one threshold T1 or coding tree depth is smaller than or equal to one threshold T2, then chroma block may use the same coding tree structure as luma. Otherwise when the block area size is smaller than or equal to T1 or luma splitting depth is larger than T2, the coding block depth of chroma component can be equal to or smaller than that of luma component.

In at least one embodiment, when luma block area size is greater than one threshold T1 or coding tree depth is smaller than or equal to one threshold T2, then chroma block may use the same coding tree structure as luma. Otherwise, luma block may still have the flexibility to be further split whereas chroma block may not be further split. The coding block depth of chroma component may be derived as coLocatedDepthLuma>T2 ?T2: coLocatedDepthLuma, wherein coLocatedDepthLuma may be the coding block depth of the co-located block in luma component, and T2 may be a positive integer, such as 1 or 2.

Figure 7:
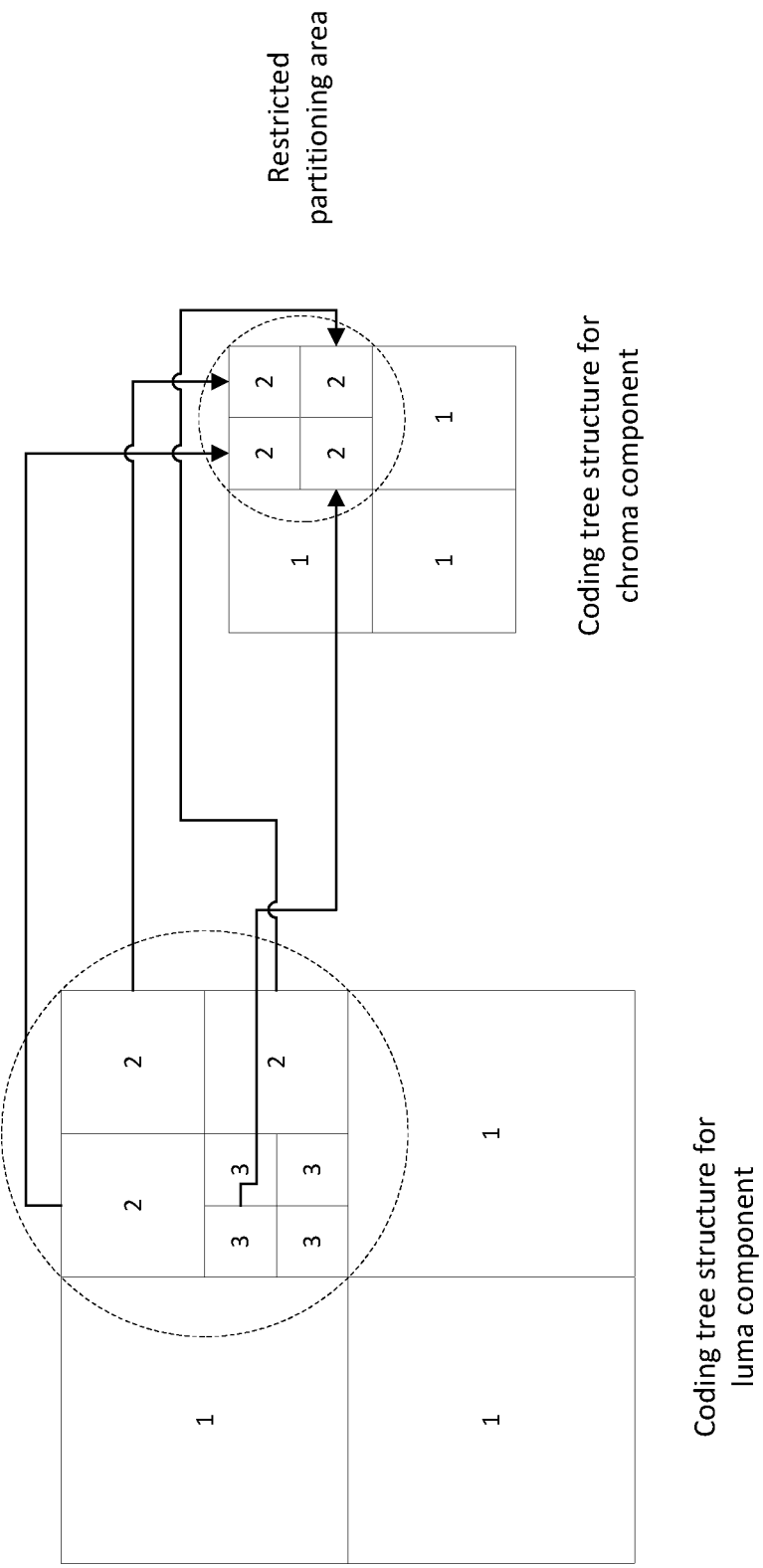
FIG. 7 illustrates an example of a restricted partitioning area, according to at least one embodiment.

In at least one embodiment, when luma block area size is greater than one threshold T1 or coding tree depth is smaller than or equal to one threshold T2, then chroma block may use the same coding tree structure as luma. Otherwise, the coding block depth of chroma component may be dependent on that of luma component. In at least one embodiment, when luma block area size is greater than one threshold T1 or coding tree depth is less than or equal to one threshold T2, then the chroma block may use the same coding tree structure as luma. Otherwise, the coding block depth of chroma component is derived as min (max (maxDepthLuma-N1,T2),coLocatedDepthLuma), wherein maxDepthLuma may be the maximum coding block depth of luma component within the restricted partitioning area, coLocatedDepthLuma may be the coding block depth of the co-located block in luma component, and N1 may be a positive integer, such as 1 or 2. An example is illustrated in FIG. 7. As shown in FIG. 7, the restricted partitioning areas for luma and chroma component are highlighted with dashed circles, and the collocated luma blocks for each chroma block are marked using solid arrows. In addition, in this example T2 is set to 1, N1 is also is set to 1. It may be observed that maxDepthLuma is 3 in the restricted partitioning area. In addition, the YUV format in this example is YUV420.

Figure 8:
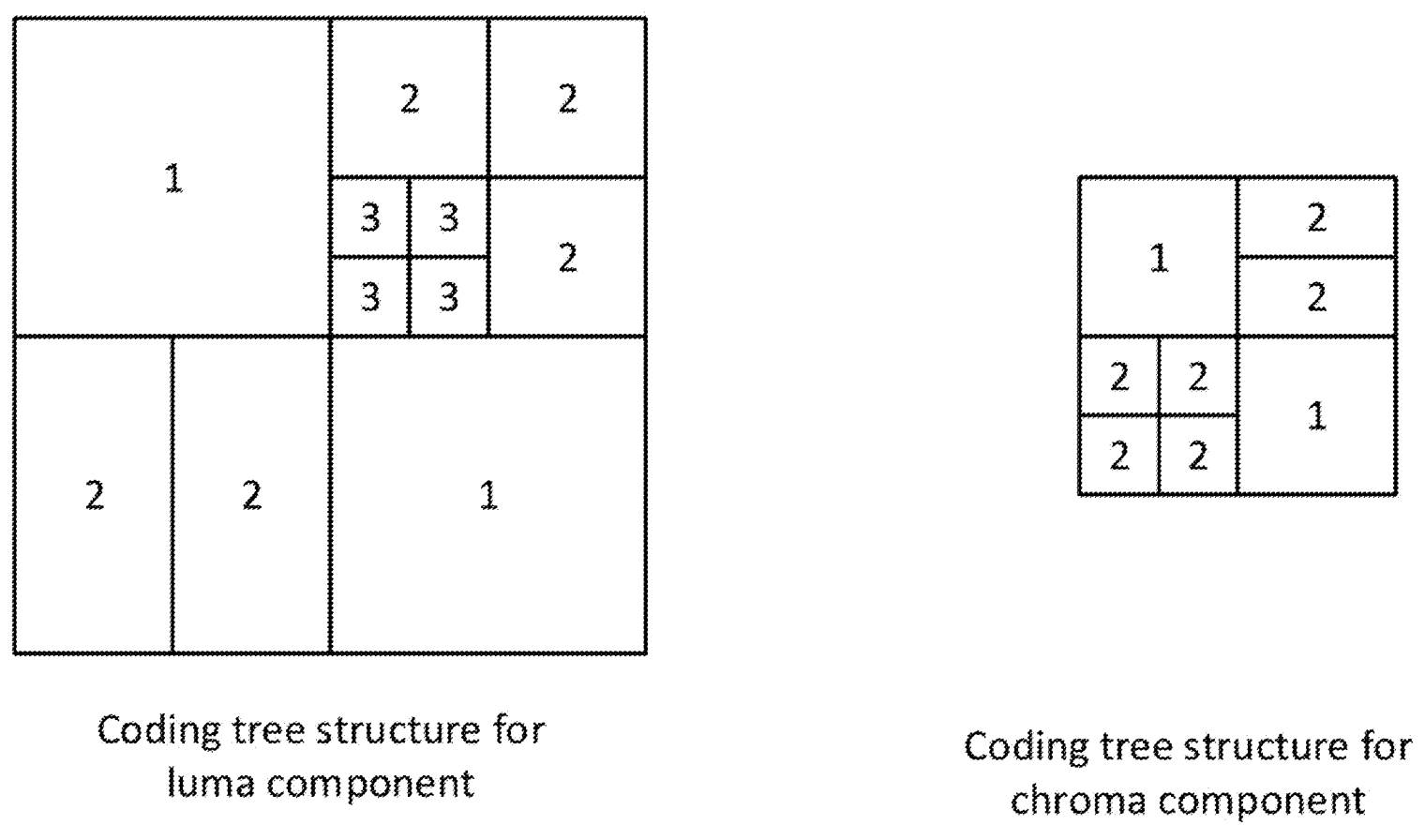

In at least one embodiment, when luma block area size is greater than one threshold T1 or coding tree depth is smaller than or equal to one threshold T2, then chroma block may use the same coding tree structure as luma. Otherwise when the area with block area size is smaller than or equal to one threshold T1 or luma splitting depth is larger than T2, the block partitioning for luma and chroma component may be decoupled, which means the block partitioning of chroma component may be independent of that of luma component. One example illustrated in FIG. 8. In the example of FIG. 8, T2 is set to 1.

In at least one embodiment, when luma block area size is greater than one threshold T1 or coding tree depth is smaller than or equal to one threshold T2, the block partitioning may be signaled jointly among different color components. Otherwise when the block area size is smaller than or equal to T1 or luma splitting depth is larger than T2), the block partitioning may be signaled separately for different color components. In one example, when the block partitioning is signaled separately for different color components, the Cb and Cr color components may still share the same block partitioning signaling, but it may be separate from the luma block partitioning signaling.

In at least one embodiment, the value one or more of T1 and T2 discussed above can be signaled in high-level syntax, including but not limited to a Video Parameter Set (VPS), Sequence Parameter Set (SPS), Picture Parameter Set (PPS), Adaptive Parameter Set (APS), Slice header, and Tile header.

Figure 9:
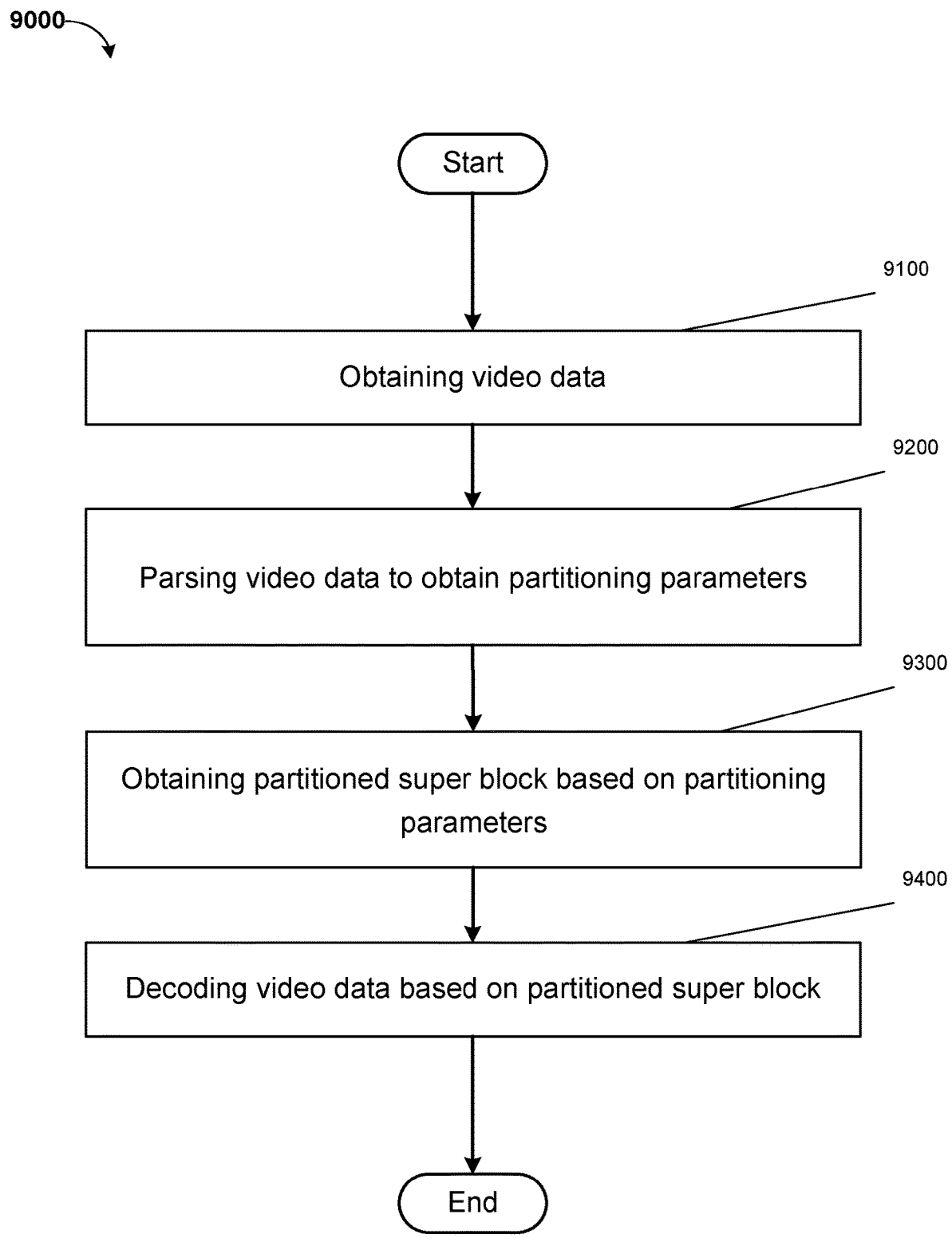
FIG. 9 is an operational flowchart illustrating the steps carried out by a program that codes video data, according to at least one embodiment.

Referring now to FIG. 9, an operational flowchart illustrating the steps of a method 9000 for encoding and/or decoding video data is depicted. In some implementations, one or more process blocks of FIG. 4 may be performed by the computer 102 (FIG. 1) and the server computer 114 (FIG. 1). In some implementations, one or more process blocks of FIG. 4 may be performed by another device or a group of devices separate from or including the computer 102 and the server computer 114.

At 9100, the method 9000 includes obtaining video data.

At 9200, the method 9000 includes parsing the obtained video data to obtain partitioning parameters.

At 9300, the method 9000 includes obtaining a partitioned super block based on the partitioning parameters. In embodiments, based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block may be partitioned based on a first block partitioning structure. In embodiments, based on the luma block area size being smaller than the first threshold, or the luma splitting depth being larger than the second threshold, the luma blocks of the partitioned super block may be partitioned based on the first block partitioning structure, and the chroma blocks of the partitioned super may be are partitioned based on a second block partitioning structure different from the first block partitioning structure.

At 9400, the method 9000 includes decoding the video data based on the partitioned super block.

In one or more embodiments, the first threshold may be one of 128 and/or 256, and the second threshold may be one of 1 and/or 2.

In one or more embodiments, the partitioned super block may correspond to an intra frame.

In one or more embodiments, a chroma splitting depth of a smallest chroma block partitioned based on the second block partitioning structure may be smaller than the luma splitting depth.

In one or more embodiments, a chroma splitting depth of a smallest chroma block partitioned based on the second block partitioning structure may be determined based on the luma splitting depth.

In one or more embodiments, the first block partitioning structure may include partitions of the second block partitioning structure with additional partitions.

In one or more embodiments, based on the luma block area size being larger than the first threshold, or the luma splitting depth being smaller than the second threshold, the partitioning parameters may be signaled jointly for a plurality of color components, and based on the luma block area size being smaller than the first threshold, or the luma splitting depth being smaller than the second threshold, the partitioning parameters may be signaled separately among the plurality of color components.

In one or more embodiments, the partitioning parameters may be signaled in at least one of a video parameter set, a sequence parameter set, a picture parameter set, an adaptive parameter set, a slice header, and/or a tile header.

It may be appreciated that FIG. 9 provides only an illustration of one implementation and does not imply any limitations with regard to how different embodiments may be implemented. Many modifications to the depicted environments may be made based on design and implementation requirements.

Figure 10:
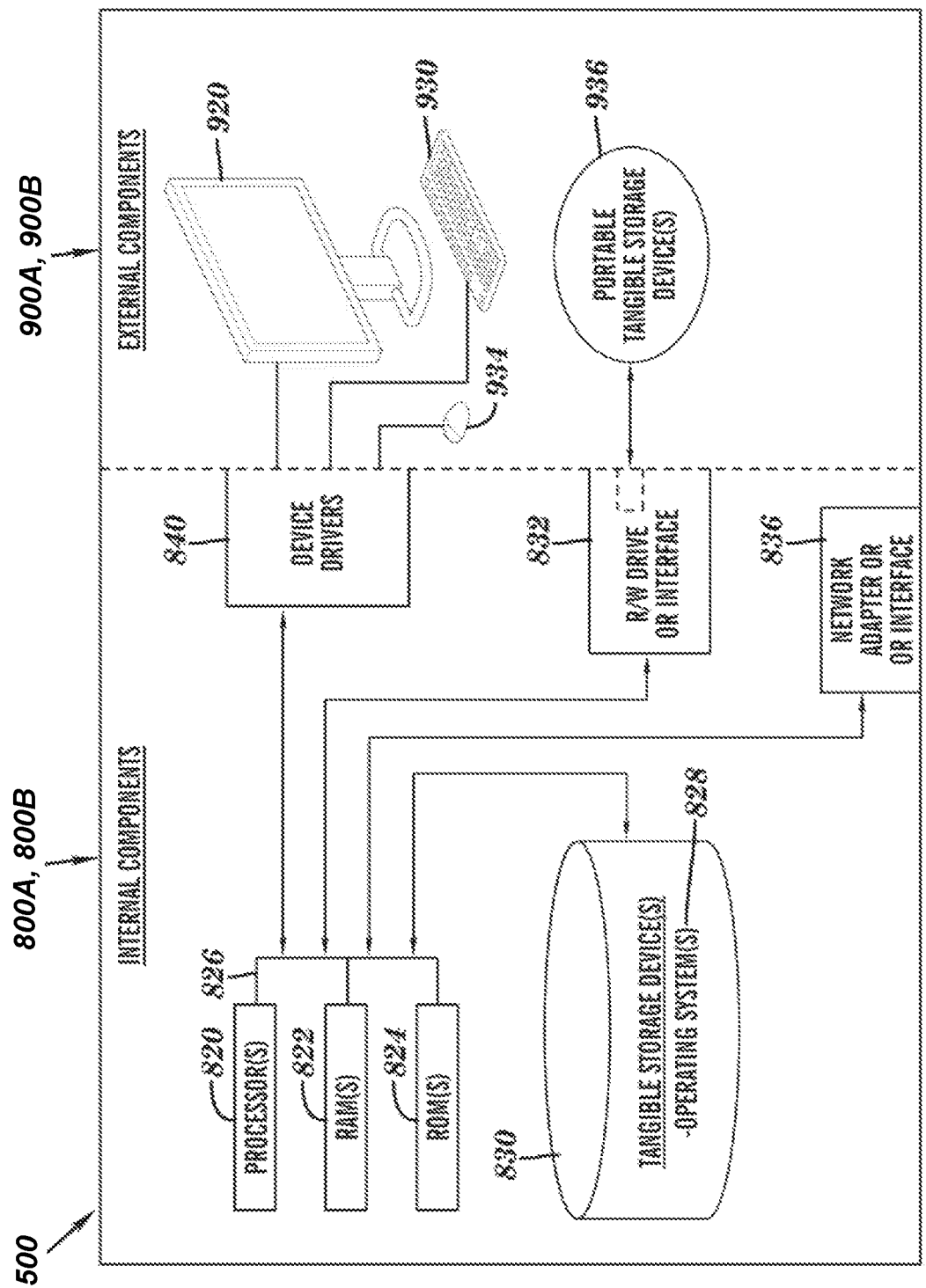
FIG. 10 is a block diagram of internal and external components of computers and servers depicted in FIG. 1 according to at least one embodiment.

FIG. 10 is a block diagram 500 of internal and external components of computers depicted in FIG. 1 in accordance with an illustrative embodiment. It should be appreciated that FIG. 10 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
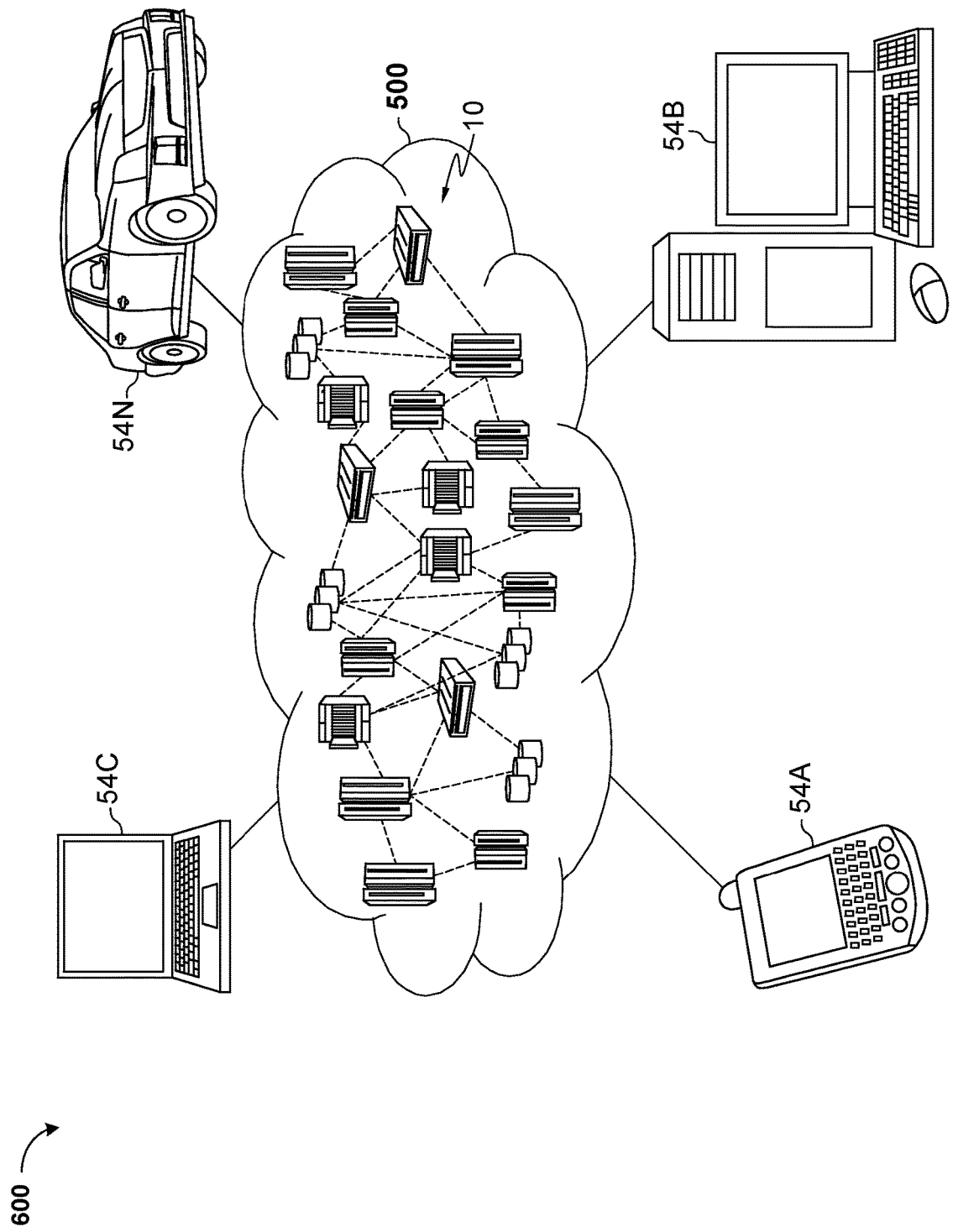
FIG. 11 is a block diagram of an illustrative cloud computing environment including the computer system depicted in FIG. 1, according to at least one embodiment.

Referring to FIG. 11, an illustrative cloud computing environment 600 is depicted which may be suitable for implementing certain embodiments of the disclosed subject matter. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 11 are intended to be illustrative only and that cloud computing nodes 10 and cloud computing environment 600 can communicate with any type of computerized device over any type of network and/or network addressable connection (e.g., using a web browser).

Figure 12:
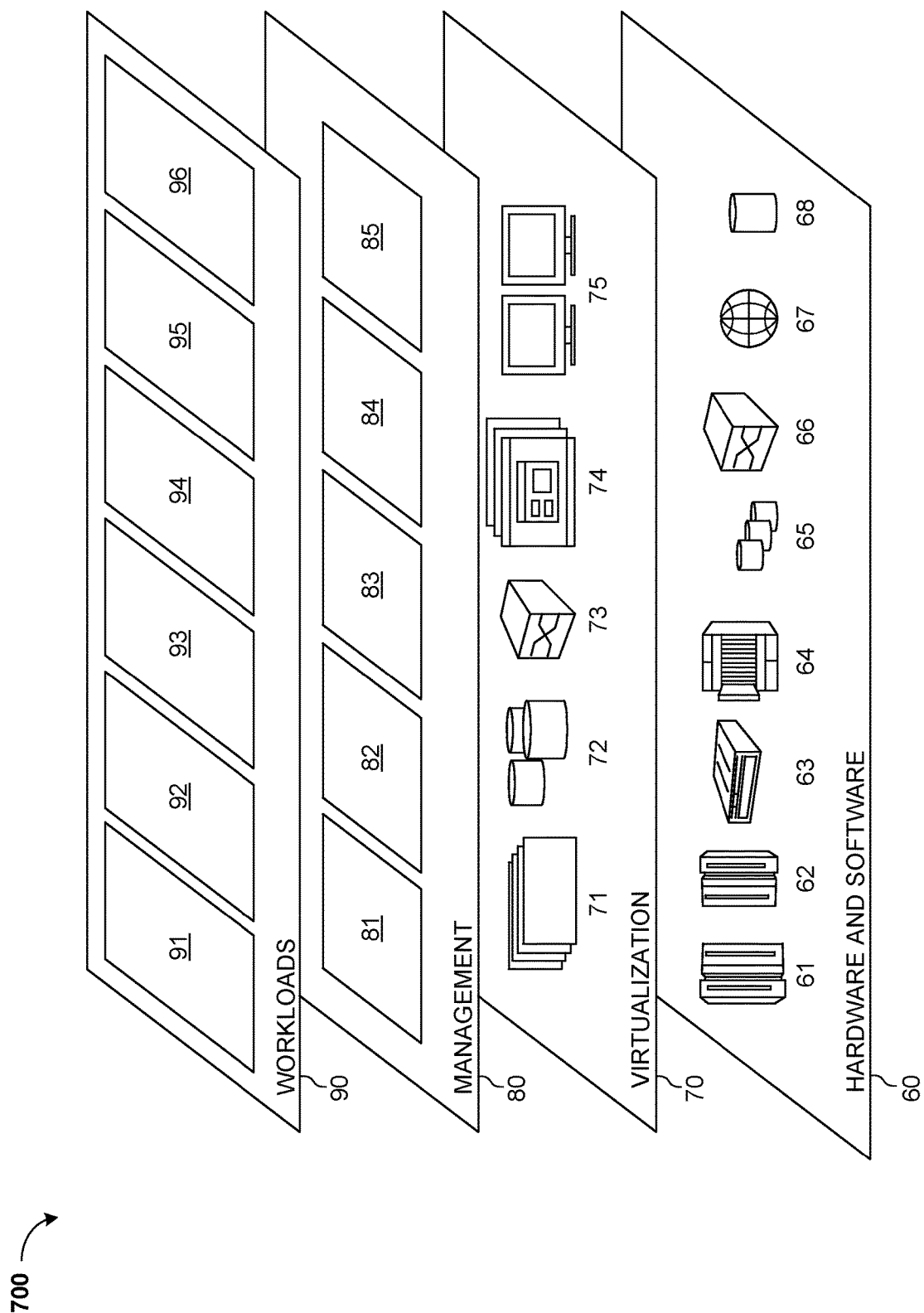
FIG. 12 is a block diagram of functional layers of the illustrative cloud computing environment of FIG. 11, according to at least one embodiment.

Referring to FIG. 12, a set of functional abstraction layers 700 provided by cloud computing environment 600 (FIG. 11) is shown. It should be understood in advance that the components, layers, and functions shown in FIG. 12 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Selected Acronyms:
HEVC: High Efficiency Video Coding
VVC: Versatile Video Coding
CfL: Chroma from Luma
SDT: Semi Decoupled Tree
SDP: Semi Decoupled Partitioning
SST: Semi Separate Tree
SB: Super Block
CTU: coding tree unit

What is claimed is:

1. A method of video decoding using at least one processor, the method comprising:
  obtaining video data;
  parsing the obtained video data to obtain partitioning parameters, wherein the partitioning parameters comprise a luma partitioning parameter corresponding to a luma component and one or more chroma partitioning parameters corresponding to a plurality of color components;
  obtaining a partitioned super block based on the partitioning parameters; and
  decoding the video data based on the partitioned super block,
  wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure,
  wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure, wherein a chroma splitting depth of a smallest chroma block partitioned based on the second block partitioning structure is determined based on the luma splitting depth, wherein based on the luma block area size of the smallest luma block being larger than the first threshold, or the luma splitting depth of the smallest luma block being smaller than the second threshold, the one or more chroma partitioning parameters comprise a chroma partitioning parameter which is signaled jointly for the plurality of color components, and wherein based on the luma block area size being smaller than the first threshold, or the luma splitting depth being larger than the second threshold, the one or more chroma partitioning parameters comprise a plurality of chroma partitioning parameters which are signaled separately for the plurality of color components.

2. The method of claim 1, wherein the first threshold is one of 128 and 256, and wherein the second threshold is one of 1 and 2.

3. The method of claim 1, wherein the partitioned super block corresponds to an intra frame.

4. The method of claim 1, wherein a chroma splitting depth of a smallest chroma block partitioned based on the second block partitioning structure is smaller than the luma splitting depth.

5. The method of claim 1, wherein the first block partitioning structure comprises partitions of the second block partitioning structure with additional partitions.

6. The method of claim 1, wherein the partitioning parameters are signaled in at least one of a video parameter set, a sequence parameter set, a picture parameter set, an adaptive parameter set, a slice header, and a tile header.

7. A device for video coding, the device comprising:
at least one memory configured to store program code; and
at least one processor configured to read the program code and operate as instructed by the program code, the program code including:
first obtaining code configured to cause the at least one processor to obtain video data;
parsing code configured to cause the at least one processor to parse the obtained video data to obtain partitioning parameters, wherein the partitioning parameters comprise a luma partitioning parameter corresponding to a luma component and one or more chroma partitioning parameters corresponding to a plurality of color components;
second obtaining code configured to cause the at least one processor to obtain a partitioned super block based on the partitioning parameters; and
decoding code configured to cause the at least one processor to decode the video data based on the partitioned super block,
wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure, wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure, wherein a chroma splitting depth of a smallest chroma block partitioned based on the second block partitioning structure is determined based on the luma splitting depth, wherein based on the luma block area size of the smallest luma block being larger than the first threshold, or the luma splitting depth of the smallest luma block being smaller than the second threshold, the one or more chroma partitioning parameters comprise a chroma partitioning parameter which is signaled jointly for the plurality of color components, and wherein based on the luma block area size being smaller than the first threshold, or the luma splitting depth being larger than the second threshold, the one or more chroma partitioning parameters comprise a plurality of chroma partitioning parameters which are signaled separately for the plurality of color components.

8. The device of claim 7, wherein the first threshold is one of 128 and 256, and wherein the second threshold is one of 1 and 2.

9. The device of claim 7, wherein the partitioned super block corresponds to an intra frame.

10. The device of claim 7, wherein a chroma splitting depth of a smallest chroma block partitioned based on the second block partitioning structure is smaller than the luma splitting depth.

11. The device of claim 7, wherein the first block partitioning structure comprises partitions of the second block partitioning structure with additional partitions.

12. The device of claim 7, wherein the partitioning parameters are signaled in at least one of a video parameter set, a sequence parameter set, a picture parameter set, an adaptive parameter set, a slice header, and a tile header.

13. A non-transitory computer-readable medium storing instructions, the instructions comprising: one or more instructions that, when executed by one or more processors of a device for video coding, cause the one or more processors to:
obtain video data;
parse the obtained video data to obtain partitioning parameters, wherein the partitioning parameters comprise a luma partitioning parameter corresponding to a luma component and one or more chroma partitioning parameters corresponding to a plurality of color components;
obtain a partitioned super block based on the partitioning parameters; and
decode the video data based on the partitioned super block,
wherein based on a luma block area size of a smallest luma block of the partitioned super block being larger than a first threshold, or a luma splitting depth of the smallest luma block being smaller than a second threshold, luma blocks of the partitioned super block and chroma blocks of the partitioned super block are partitioned based on a first block partitioning structure, wherein based on the luma block area size being smaller than the first threshold, or the luma splitting depth being larger than the second threshold, the luma blocks of the partitioned super block are partitioned based on the first block partitioning structure, and the chroma blocks of the partitioned super block are partitioned based on a second block partitioning structure different from the first block partitioning structure, wherein a chroma splitting depth of a smallest chroma block partitioned based on the second block partitioning structure is determined based on the luma splitting depth, wherein based on the luma block area size of the smallest luma block being larger than the first threshold, or the luma splitting depth of the smallest luma block being smaller than the second threshold, the one or more chroma partitioning parameters comprise a chroma partitioning parameter which is signaled jointly for the plurality of color components, and wherein based on the luma block area size being smaller than the first threshold, or the luma splitting depth being larger than the second threshold, the one or more chroma partitioning parameters comprise a plurality of chroma partitioning parameters which are signaled separately for the plurality of color components.

14. The non-transitory computer-readable medium of claim 13, wherein the partitioned super block corresponds to an intra frame.

15. The non-transitory computer-readable medium of claim 13, wherein a chroma splitting depth of a smallest chroma block partitioned based on the second block partitioning structure is smaller than the luma splitting depth.

16. The device of claim 7, wherein the partitioning parameters are signaled in at least one of a video parameter set, a sequence parameter set, a picture parameter set, an adaptive parameter set, a slice header, and a tile header.

* * * * *